US009638082B2

(12) United States Patent
Fujita et al.

(10) Patent No.: US 9,638,082 B2
(45) Date of Patent: May 2, 2017

(54) FLUID CONTROL VALVE DEVICE

(71) Applicant: HAMANAKODENSO CO., LTD., Kosai, Shizuoka-pref. (JP)

(72) Inventors: Yasunari Fujita, Hamamatsu (JP); Junichiro Itou, Hamamatsu (JP)

(73) Assignee: Hamanakodenso Co., Ltd., Kosai, Shizuoka-Pref. (JP)

( * ) Notice: Subject to any disclaimer, the term of this patent is extended or adjusted under 35 U.S.C. 154(b) by 0 days.

(21) Appl. No.: 14/882,609

(22) Filed: Oct. 14, 2015

(65) Prior Publication Data

US 2016/0115845 A1 Apr. 28, 2016

(30) Foreign Application Priority Data

Oct. 24, 2014 (JP) ................................. 2014-217565

(51) Int. Cl.

| F01N 3/22 | (2006.01) |
| F16K 1/42 | (2006.01) |
| F16K 25/00 | (2006.01) |
| F16K 31/06 | (2006.01) |

(52) U.S. Cl.
CPC .................. *F01N 3/22* (2013.01); *F16K 1/42* (2013.01); *F16K 25/00* (2013.01); *F16K 31/0655* (2013.01)

(58) Field of Classification Search
CPC ...... F01N 3/22; F16K 1/42; F16J 15/00; F16J 15/04
USPC ......................................... 251/333, 334, 357
See application file for complete search history.

(56) References Cited

U.S. PATENT DOCUMENTS

| 47,097 | A | * | 4/1865 | Fales | .......................... F16K 1/42 |
| | | | | | 25/333 |
| 908,139 | A | * | 12/1908 | Ricksecker | ............... F16K 1/42 |
| | | | | | 251/333 |
| 1,234,096 | A | * | 7/1917 | Farrell | ..................... F16K 27/02 |
| | | | | | 251/225 |
| 2,005,954 | A | * | 6/1935 | Petersen | ................. F16K 15/06 |
| | | | | | 137/533.29 |
| 2,218,871 | A | * | 10/1940 | Broden | ...................... F16K 1/00 |
| | | | | | 251/333 |

(Continued)

FOREIGN PATENT DOCUMENTS

JP 2008-075827 4/2008

OTHER PUBLICATIONS

U.S. Appl. No. 14/747,034, filed Jun. 23, 2015, Fujita et al.

*Primary Examiner* — Craig Schneider
*Assistant Examiner* — Daniel P Donegan
(74) *Attorney, Agent, or Firm* — Harness, Dickey & Pierce, P.L.C.

(57) ABSTRACT

A fluid control valve device includes a seal part disposed to a valve part. The seal part is elastically deformable and contacts a valve seat when a fluid passage is closed to intercept fluid from passing through the fluid passage. The valve seat has a surface opposing the seal part, a first projection part projected from the surface toward an upper surface of the seal part and having an annular shape, and a second projection part projected from the surface toward the upper surface of the seal part on a radially outer side of the first projection part. When the fluid passage is closed by the valve part, the first projection part is in tight contact with the seal part, and the second projection part is configured to collide with the seal part.

12 Claims, 9 Drawing Sheets

(56) References Cited

U.S. PATENT DOCUMENTS

| | | | | |
|---|---|---|---|---|
| 2,402,950 A * | 7/1946 | Culver | F16K 27/029 | 164/DIG. 7 |
| 3,908,370 A * | 9/1975 | Kuroda | F01N 3/22 | 137/599.09 |
| 3,945,390 A * | 3/1976 | Huber | F16K 1/34 | 137/1 |
| 4,112,283 A * | 9/1978 | Lathrop | F16J 15/04 | 116/200 |
| 4,124,195 A * | 11/1978 | Braun | F16K 1/42 | 251/333 |
| 4,180,975 A * | 1/1980 | Takagi | F01N 3/22 | 60/290 |
| RE31,417 E * | 10/1983 | Huber | F16K 1/34 | 137/1 |
| 6,308,958 B1 * | 10/2001 | Turnquist | F01D 11/02 | 277/347 |
| 7,384,235 B2 * | 6/2008 | Adis | F01D 11/001 | 277/413 |
| 7,523,763 B2 * | 4/2009 | Katsuta | F15B 13/0405 | 137/625.27 |
| 2002/0175569 A1 * | 11/2002 | Komiyama | F01N 3/22 | 310/12.04 |
| 2005/0204732 A1 * | 9/2005 | Kouzu | F01N 3/22 | 60/307 |
| 2007/0017217 A1 * | 1/2007 | Kouzu | F01N 3/206 | 60/289 |
| 2007/0017577 A1 * | 1/2007 | Kouzu | F01N 3/22 | 137/339 |
| 2008/0073605 A1 | 3/2008 | Ishigaki et al. | | |
| 2010/0001222 A1 * | 1/2010 | Muzzo | F16K 1/02 | 251/328 |
| 2015/0377107 A1 * | 12/2015 | Fujita | F01N 3/32 | 251/318 |
| 2016/0115845 A1 * | 4/2016 | Fujita | F16K 1/42 | 251/318 |

* cited by examiner

FIG. 15

FLUID CONTROL VALVE DEVICE

CROSS REFERENCE TO RELATED APPLICATION

This application is based on Japanese Patent Application No. 2014-217565 filed on Oct. 24, 2014, the disclosure of which is incorporated herein by reference in its entirety.

TECHNICAL FIELD

The present disclosure relates to a fluid control valve device that controls a flow of fluid flowing through a fluid passage.

BACKGROUND

JP 2008-75827A (corresponding to US 2008/0073605 A1) describes a fluid control valve arranged in a secondary air feed system that warms up a three-way catalyst at a time of starting a gasoline engine. Specifically, secondary air generated in a secondary air pipe is introduced to a three-way catalyst converter corresponding to an exhaust gas cleaning apparatus. The fluid control valve integrally has an electromagnetic valve which opens and closes a secondary air passage defined inside the housing, and a check valve that restricts fluid such as exhaust gas from flowing backwards to the electromagnetic valve and an electric air pump inside the system.

The electromagnetic valve includes a housing, a valve, a coil spring, and a seal rubber. The secondary air passage defined in the housing integrally has a valve seat. The valve reciprocates in the axial direction to approach or separate from the valve seat. The coil spring biases the valve in a valve-closing direction. The valve constitutes a valve object which approaches or separates from the valve seat to close or open the air passage. The electromagnetic valve has a valve head and a shaft part. The valve head has a flange shape and is received in the housing to be able to open and close. The shaft part has a cylindrical shape straightly extending to an actuator from the central part of the valve head, and reciprocates in the axial direction.

The seal rubber mounted to the outer periphery part of the valve head has a ring part opposing to the valve seat and a seal lip projected toward the valve seat. In the cross-section, the seal lip has a taper shape inclined to the axis of the valve so that the tip end is located on the radially outer side of the root end. The seal rubber has plural load receptacle parts on the inner side of the seal lip. The projection length of the load receptacle part is smaller than that of the seal lip. The load receptacle part receives the load of the valve by contacting the valve seat when the valve is fully closed. At this time, the seal lip is elastically deformed to bend toward the outer periphery of the valve and is in the tight contact with the surface of the valve seat, when the valve is fully closed, such that a clearance between the valve head and the valve seat is certainly closed.

When the seal lip is not in contact with the valve, the seal lip extends obliquely upward from the surface of the valve head toward the valve seat. For this reason, water adhering to the surface of the valve head opposing to the valve seat may be supported by the seal lip to stay on the surface of the valve head. This phenomenon may be generated, for example, when exhaust gas flows backwards through the check valve that is opened such that water contained in the exhaust gas adheres to the surface of the valve head. The water staying on the surface of the valve head may cause freezing or locking of the valve to restrict normal operation of the valve.

SUMMARY

It is an object of the present disclosure to provide a fluid control valve device in which freezing or adhesion of a foreign matter at a valve part is restricted.

According to an aspect of the present disclosure, a fluid control valve device includes a housing, a valve part, and a seal part. The housing has a valve seat, in which a fluid passage is defined, to have an annular shape. The valve part is able to open the fluid passage by moving away from the valve seat and to close the fluid passage by moving toward the valve seat. The seal part is disposed to the valve part, and is elastically deformable. When the fluid passage is closed, the seal part is in contact with the valve seat to intercept fluid from passing through the fluid passage. The valve seat has a surface opposing the seal part, a first projection part projected from the surface toward an upper surface of the seal part and having an annular shape, and a second projection projected from the surface toward the upper surface of the seal part on a radially outer side of the first projection part. When the fluid passage is closed by the valve part, the first projection part is in tight contact with the seal part, and the second projection part is configured to collide with the seal part.

Accordingly, when the valve part moves toward the valve seat to close the fluid passage, the first projection part contacts the seal part and the seal part begins the elastic deformation. When the first projection part is in the tight contact with the seal part, the fluid passage is closed to intercept fluid from passing through the fluid passage. At the time of valve closing operation, the second projection part collides to the seal part. Since the surface of the seal part is struck, a foreign substance adhering to the seal part such as deposit or ice can be broken. Since the foreign substance broken or separated from the seal part is not fixed to the seal part, the foreign substance can be removed from the upper surface of the seal part by repetitive operation of opening and closing the valve. Thus, the foreign substance is removed from the seal part, and the first projection part and the seal part can be in the tight contact at the time of closing the valve.

The valve seat has the first projection part and the second projection part. The second projection part works as an edge part which changes a foreign substance adhering to the upper surface of the seal part to the removable state. The first projection part secures the sealing property relative to the seal part from which the foreign substance is removed. Therefore, the fluid control valve device can be offered in which freezing or adhesion of a foreign matter at a valve part is restricted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A fluid control valve device according to a first embodiment is explained referring to FIG. 1 to FIG. 5.

Figure 1:
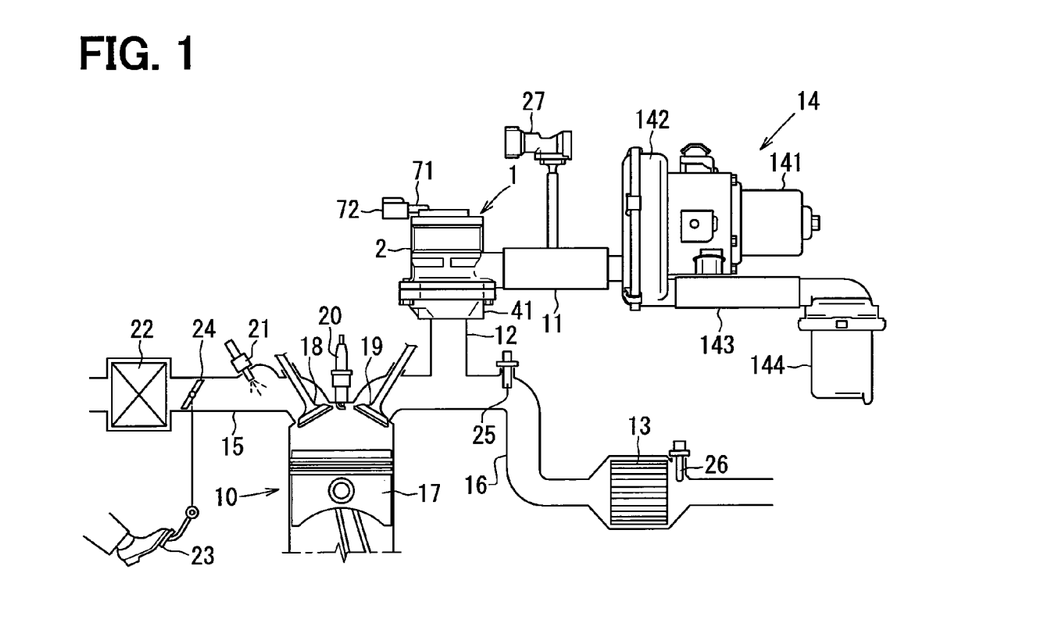
FIG. 1 is a view illustrating a secondary air feed system equipped with a secondary air regulator valve according to a first embodiment.

When an internal combustion engine such as gasoline engine is started, a secondary air feed system warms up a three-way catalyst. Specifically, secondary air in a secondary air pipe 11, 12 is introduced to a three-way catalyst converter 13 corresponding to an exhaust gas cleaning apparatus. The secondary air feed system is mounted to an engine compartment of a vehicle, and includes a secondary air regulator valve 1 as a fluid control valve device. An electric air pump 14 and the secondary air regulator valve 1 are gas-tightly connected to each other through the secondary air pipe 11. The secondary air regulator valve 1 and an exhaust pipe 16 are gas-tightly connected to each other through the secondary air pipe 12.

The three-way catalyst converter 13 cleans gas exhausted from the combustion chamber of each cylinder of the engine 10. Carbon monoxide, hydrocarbon, and nitrogen oxide contained in the exhausted gas are made harmless by the chemical reaction. The three-way catalyst converter 13 is an exhaust gas cleaning apparatus for the engine, for example, in which hydrocarbon is changed to harmless water by the oxidization action.

In the engine 10, thermal energy is produced by combustion of fuel-air mixture in the combustion chamber. The engine 10 has an intake pipe 15 supplying intake air to the combustion chamber of each cylinder, and the exhaust pipe 16 exhausting gas out of the combustion chamber of each cylinder to outside via the three-way catalyst converter 13. The engine 10 has a cylinder block which slidably supports the piston 17 within a cylinder bore, and a cylinder head with an intake port and an exhaust port.

The intake port and the exhaust port of the engine 10 are opened and closed by the intake valve 18 and the exhaust valve 19 respectively. The spark plug 20 is attached to the cylinder head of the engine 10 so that the tip end is exposed to the combustion chamber. An electromagnetic fuel injection valve 21 is attached on the wall surface of the intake port or the back wall surface of the intake valve 18.

An intake passage is defined in the intake pipe 15, and is connected to the combustion chamber of the engine 10 through the intake port. Intake air is drawn to the combustion chamber of the engine 10 through the intake passage. An air cleaner 22 and a throttle valve 24 are received in the intake pipe 15. The air cleaner 22 filters intake air, and the throttle valve 24 opens and closes the passage corresponding to the operation of accelerator 23 (based on the accelerator valve opening).

An exhaust passage is defined in the exhaust pipe 16, and is connected to the combustion chamber of the engine 10 through the exhaust port. Exhaust gas flowing out of the combustion chamber of the engine 10 flows in the exhaust pipe 16 to the three-way catalyst converter 13. An air/fuel ratio sensor 25 detecting the air/fuel ratio (oxygen concentration) of exhaust gas, a catalyst temperature sensor 26 detecting the temperature of three-way catalyst, and an exhaust temperature sensor detecting the temperature of exhaust gas are arranged in the exhaust pipe 16.

The secondary air feed system includes the secondary air regulator valve 1, the secondary air pipe 11, 12 and the electric air pump 14. The secondary air passage defined in the secondary air pipe 11, 12 is connected to the exhaust passage of the exhaust pipe 16. Secondary air flows in the secondary air passage. A pressure sensor 27 which detects the pressure of secondary air is arranged in the secondary air pipe 11, 12.

The electric air pump 14 is gas-tightly connected to the upstream end of the secondary air pipe 11, and has an electric motor, a pump impeller and an air filter. The electric motor generates driving force by receiving supply of electric power. The pump impeller is rotated by the electric motor. The air filter prevents a foreign substance from entering the pump impeller. The electric air pump 14 has a motor housing 141, a pump housing 142, and a filter case 144. The motor housing 141 holds the electric motor inside. The pump housing 142 rotatably receives the pump impeller inside. The filter case 144 is gas-tightly combined with the pump housing 142 through an air duct 143.

Figure 2:
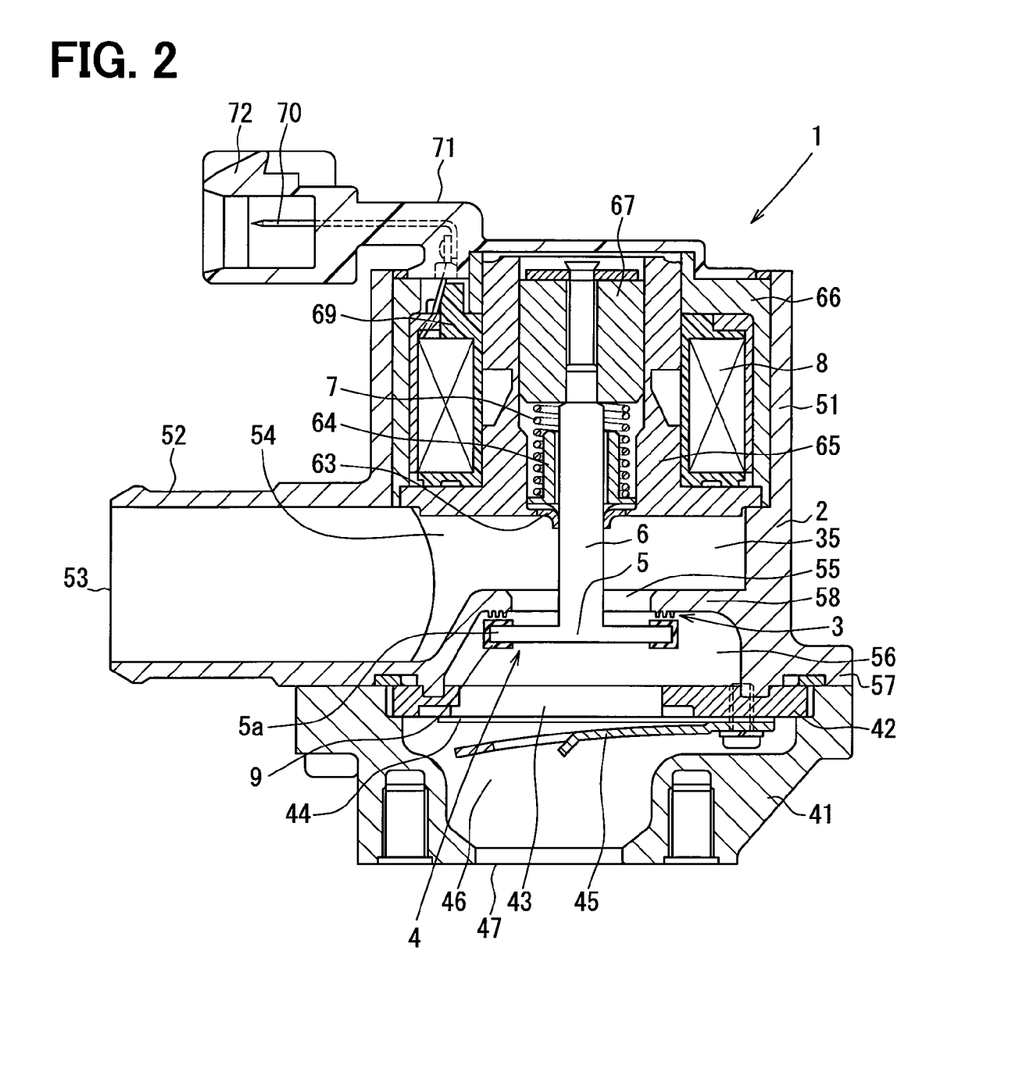
FIG. 2 is a sectional view illustrating the secondary air regulator valve of the first embodiment.

The secondary air regulator valve 1 is gas-tightly connected between the secondary air pipe 11 and the secondary air pipe 12. The secondary air regulator valve 1 is an electromagnetic fluid control valve integrally having an air switching valve (ASV) and a check valve, and may be referred to a combination valve module. The air switching valve configures an electromagnetic valve that opens and closes the secondary air passage 35 defined inside of the housing 2. The check valve restricts fluid such as exhaust gas from flowing backwards to the system with ASV and the electric air pump from the connection at which the secondary air pipe 12 and the exhaust pipe 16 are connected.

The check valve includes a housing 41 combined to the downstream side of the housing 2 of ASV in the flowing direction of secondary air, and a metal plate 42 held at the housing 41. The check valve further includes a reed valve 44 and a reed stopper 45. The reed valve 44 has a thin film part which opens and closes plural air ports 43 defined in the metal plate 42. The reed stopper 45 regulates the opening degree or the maximum opening of the reed valve 44.

The housing 41 is gas-tightly connected to the upstream end of the secondary air pipe 12. When the reed valve 44 opens, the secondary air flows from the plural air ports 43 into a fluid outlet passage 46 defined in the housing 41, and flows out of the outlet port 47 that is an outlet part of the housing 41. The reed valve 44 is a valve object of the check valve that is opened by the pressure of secondary air output from the electric air pump 14.

ASV includes the housing 2, the poppet valve 4, the coil spring 7 and the seal part 9. The secondary air passage 35 is defined in the housing 2. The valve seat 3 having annular shape is integrally formed in the housing 2. The poppet valve 4 reciprocates in the axial direction to approach or separate from the valve seat 3. The coil spring 7 biases the valve head 5 and the shaft part 6 of the poppet valve 4 in the valve closing direction (to be seated on the valve seat 3). The seal part 9 is in contact with the valve seat 3 when the valve is closed. The seal part 9 is an elastically deformable portion provided on the valve head 5. At a time of closing the valve, the seal part 9 is in tight contact with the valve seat 3, such that fluid is restricted from passing through the air passage 55.

The secondary air feed system includes the engine control unit (ECU) which electronically controls the actuator which is a power source of the secondary air regulator valve 1 and the electric motor which is a power source of the electric air pump 14 based on the operational status of the engine 10. ECU has a microcomputer with CPU, memory such as ROM and RAM storing various programs and data, an input circuit, an output circuit, an electromagnetic valve drive circuit, and a pump drive circuit.

When the ignition switch is turned on, ECU controls opening-and-closing operation of ASV of the secondary air regulator valve 1 by controlling the drive power supplied to the actuator of the secondary air regulator valve 1 based on the control program stored in the memory. Furthermore, ECU controls rotation operation such as speed of the electric air pump 14 by controlling the power supplied to the electric motor of the electric air pump 14.

The temperature of exhaust gas is detected by the exhaust temperature sensor at the time of starting the engine. When the temperature of exhaust gas is lower than or equal to a predetermined value, ECU controls to supply the drive power to the actuator of the secondary air regulator valve 1 to open the poppet valve 4. At this time, since electric power is supplied also to the electric motor of the electric air pump 14, flow of secondary air is generated inside the secondary air pipe 11, 12.

When the engine is started, the electric air pump 14 is simultaneously driven since load is applied to the engine. By operation of the electric air pump 14, clean and warm air can be sent to the three-way catalyst converter 13. Therefore, the three-way catalyst converter 13 can be quickly warmed. Due to the quick startup of the three-way catalyst converter 13, the purification performance of the three-way catalyst converter 13 can be increased.

ECU has a failure-diagnosis function to diagnose failure of the electric air pump 14. When the pressure of secondary air detected by the pressure sensor 27 in the secondary air pipe 11, 12 is not in a predetermined pressure range, ECU determines that there is abnormality, and limits or stops the power supply to the actuator of the secondary air regulator valve 1 and the electric motor of the electric air pump 14.

The housing 2 of ASV is manufactured by die-casting with metal material such as aluminum, and has the cylindrical wall part 51. The poppet valve 4 is arranged in the cylindrical wall part 51. The inlet pipe 52 is integrally formed with the cylindrical wall part 51, and extends perpendicular to the cylindrical wall part 51. In other words, the radial direction of the cylindrical wall part 51 corresponds to the axial direction of the inlet pipe 52.

Secondary air flows into the air passage 55 defined inside the valve seat 3 via the fluid introduction passage 54 defined in the housing 2 from the inlet port 53 which is an inlet part of the inlet pipe 52. The communicate passage 56 is defined at the outlet part of the housing 2. The air passage 55 and the air ports 43 of the check valve communicate to each other through the communicate passage 56. An attachment part 57 is formed at the opening end of the outlet part of the housing 2, and is combined with the housing 41. The secondary air passage 35 inside of ASV is configured by the air passage 55, the fluid introduction passage 54, and the communicate passage 56.

A circular partition part 58 is arranged to the inner circumference part of the cylindrical wall part 51, and divides the inside of the housing 2 into the fluid introduction passage 54 and the communicate passage 56. As shown in FIG. 2, at least the lower end surface of the partition part 58 integrally defines the valve seat 3 having a ring shape, to which the valve head 5 and the seal part 9 are seated. Secondary air passes through the round air passage which is formed in the valve seat 3 as a fluid passage.

The poppet valve 4 is integrally molded using metal material such as stainless steel or resin material, and is movably held in the housing 2. The poppet valve 4 may correspond to a valve object which approaches the valve seat 3 to close the air passage 55 or which separates from the valve seat 3 to open the air passage 55. The poppet valve 4 integrally includes the shaft part 6 and the valve head 5. The shaft part 6 has a cylindrical shape extending from the central part of the valve head 5 upward to the actuator. The valve head 5 has a flange shape projected from the lower end of the shaft part 6, and has a size able to cover the air passage 55. The shaft part 6 passes through the air passage 55 in the axial direction. The upper (back) surface of the valve head 5 is seated onto the lower end surface of the valve seat 3. The valve head 5 has the shape of disk with an outer diameter that is larger than that of the shaft part 6.

The outer diameter of the valve head 5 is larger than that the air passage 55. The upper surface of the valve head 5 which faces the valve seat 3 is defined by a plane perpendicular to the axis of the shaft part 6. The poppet valve 4 has T-shaped vertical cross-section. In other words, the outer diameter of the outer periphery part 5a of the valve head 5 is larger than that the air passage 55, and the upper surface which faces the valve seat 3 is defined by a plane perpendicular to the axis of the shaft part 6.

Figure 3:
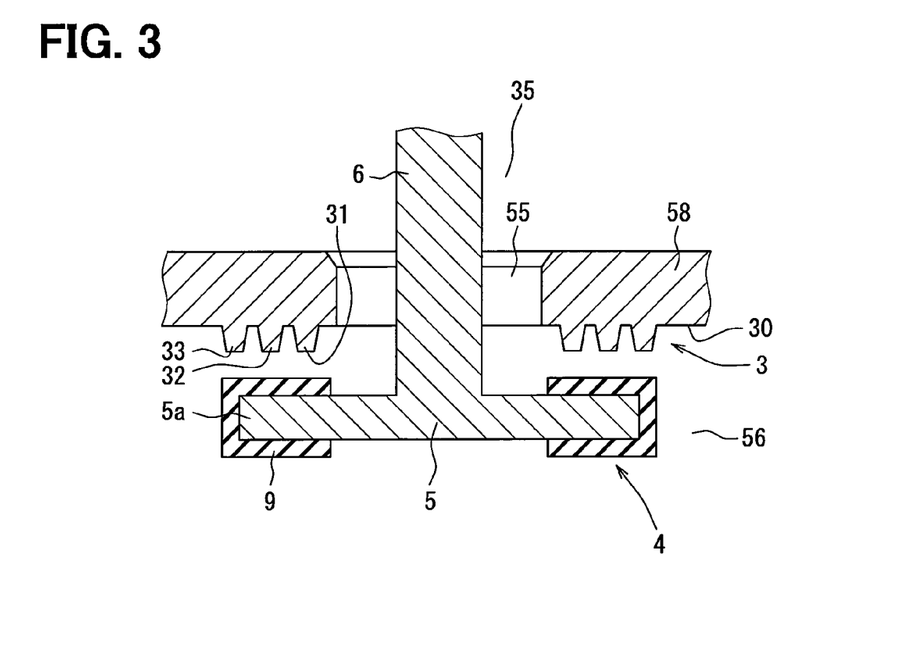
FIG. 3 is a partial view illustrating an open state of the secondary air regulator valve of the first embodiment.
Figure 4:
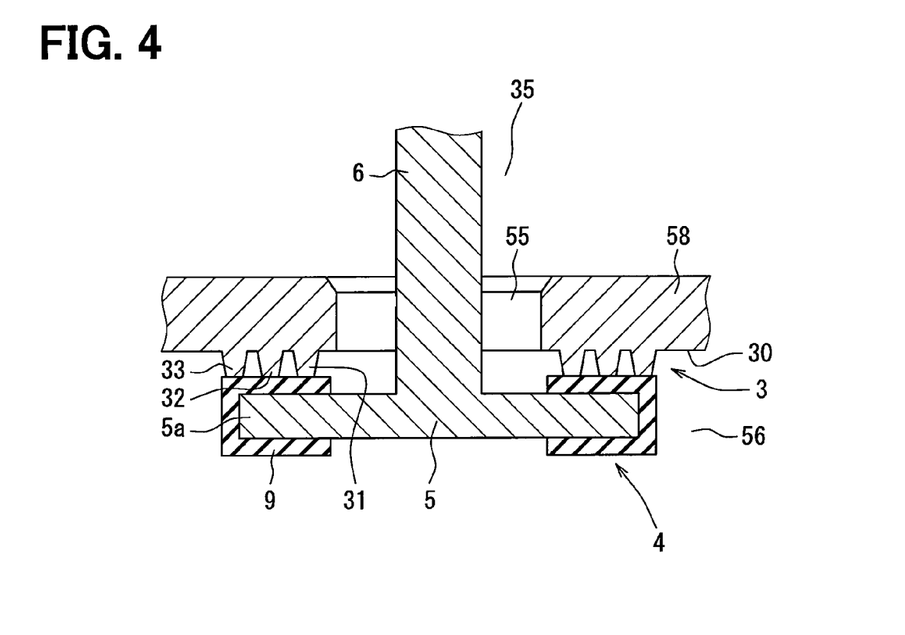
FIG. 4 is a partial view illustrating a closed state of the secondary air regulator valve of the first embodiment.

The valve seat 3 has a first projection part 31 and a second projection part 32, 33 opposing the upper surface of the seal part 9. When the valve head 5 is seated onto the valve seat 3, the first projection part 31 and the second projection part 32, 33 contact the upper surface of the seal part 9, such that the seal part 9 is elastically deformed. When the first projection part 31 is tightly in contact with the seal part 9, the ASV is closed to intercept fluid from passing through the air passage 55.

The outer diameter of the outer periphery part 5a is larger than that of the second projection part 32, 33 that is not compressed when the valve head 5 is not seated on the valve seat 3. The valve head 5 and the shaft part 6 may be manufactured separately, and the poppet valve 4 may be produced by combining the valve head 5 and the shaft part 6.

When the valve head 5 is distanced from the valve seat 3 to fully open the valve, the valve head 5 is held in the middle of the communicate passage 56 that is a space defined between the check valve and the valve seat 3. That is, at the valve full open time, the poppet valve 4 is moved toward the check valve downward along the axis of the poppet valve 4. Furthermore, when the poppet valve 4 reciprocates along the axial direction of the shaft part 6, the valve head 5 is displaced in the axial direction relative to the valve seat 3.

When the poppet valve 4 moves in the valve opening direction downward along the axial direction, the valve head 5 is separated from the valve seat 3 to open the air passage 55 at the valve full open position.

When the poppet valve 4 moves in the valve closing direction upward along the axial direction, the valve head 5 is seated on the valve seat 3 and in tight contact with the first projection part 31 to close the air passage 55 at the valve full closed position.

ASV is set at the valve full closed position when the poppet valve 4 is closed, and is set at the valve full open position when the poppet valve 4 is opened. ASV is able to change the position of the poppet valve 4 at least between two positions, i.e., the valve full open position and the valve full closed position. The poppet valve 4 is able to open the air passage 55, when the seal part 9 is separated from the first projection part 31. The poppet valve 4 is able to close the air passage 55, when the seal part 9 contacts the first projection part 31.

The valve seat 3 is defined around the peripheral part of the air passage 55, and is made of the same material as the housing 2. The valve seat 3 integrally has the first projection part 31 to seal a clearance between the valve head 5 and the valve seat 3 by contacting with the seal part 9 when the poppet valve 4 is closed. The first projection part 31 is formed entirely around the peripheral part of the partition part 58 defining the air passage 55, and is made of the same material as the housing 2.

The valve seat 3 further integrally has the second projection part 32, 33 on the radially outer side of the first projection part 31. The second projection part 32, 33 has a trapezoid shape in the vertical cross-section, and is projected to the upper surface of the seal part 9 from the surface 30 of the valve seat 3 facing downward to oppose the seal part 9. The second projection part 32, 33 is formed integrally with the valve seat 3 around the peripheral part defining the air passage 55, and is made of the same material as the housing 2.

At the time of closing the poppet valve 4, the first projection part 31 contacts and sticks to the seal part 9, such that fluid is prohibited from flowing through the air passage 55. The first projection part 31 works as a main seal part which intercepts the communication between the communicate passage 56 and the secondary air passage 35 when the valve is closed.

At the valve closing time, the second projection part 32, 33 presses the seal part 9, and gives a shock to the seal part 9. In case where a foreign substance such as deposit to which fuel burning adhered or ice exists on the upper surface of the seal part 9, the second projection part 32, 33 can give a shock to the foreign substance. At this time, the foreign substance is broken or separated from the seal part 9. Then, the foreign substance is removed from the valve when the valve is opened and closed. The second projection part 32, 33 is a foreign substance removing portion to remove the foreign substance from the upper surface of the seal part 9.

Figure 5:
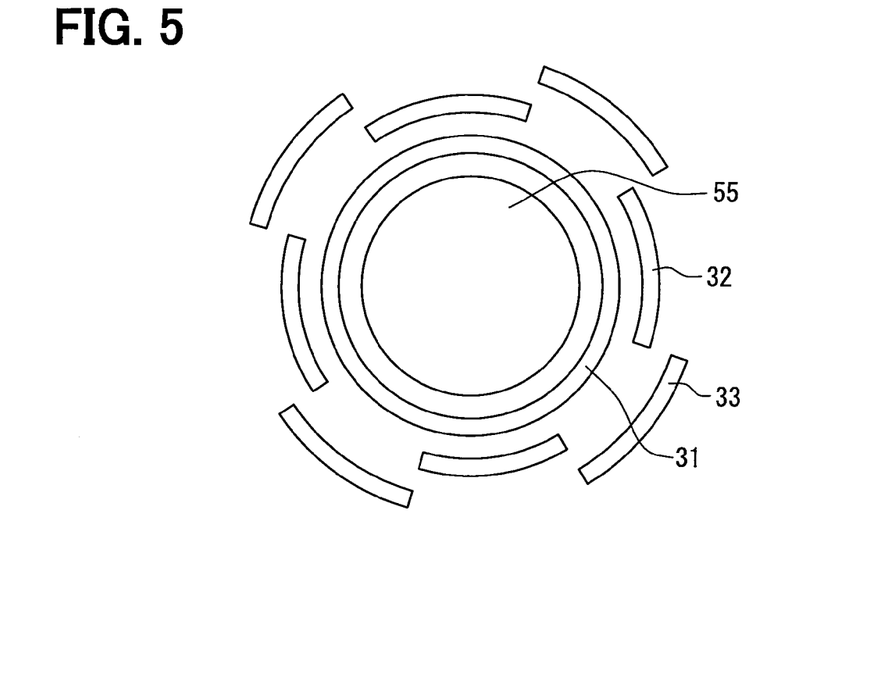
FIG. 5 is a bottom view illustrating a valve seat of the secondary air regulator valve of the first embodiment.

FIG. 5 is a bottom view of the valve seat 3. As shown in FIG. 5, the second projection part 32 is separated into plural units arranged in the circumference direction at interval around the circumference of the first projection part 31, and the second projection part 33 is separated into plural units arranged in the circumference direction at interval around the circumference of the first projection part 31. The second projection part 32 is partially provided to have the shape of a ring around the circumference of the first projection part 31, and the second projection part 33 is partially provided to have the shape of a ring around the circumference of the first projection part 31. The second projection part 32 and the second projection part 33 are arranged not to overlap with each other in the radial direction. The second projection part 33 does not exist on the radially outer side of the second projection part 32, and is formed on the radially outer side of the area where the second projection part 32 is not formed. The second projection part 32, 33 may have an annular form in which the projection shape does not continue over all the circumference of the first projection part 31. In other words, the annular form may be divided partially by the projection shape.

When a foreign substance is caught between the first projection part 31 and the second projection part 32 or between the second projection part 32 and the second projection part 33 in the valve seat 3, the foreign substance is easily removed to outside, due to the arrangement and form of the second projection part 32 or the second projection part 33. Therefore, a foreign substance is not easily accumulated around the valve seat 3.

After the seal part 9 is manufactured separately from the valve head 5, the seal part 9 is combined with the outer periphery part 5a of the valve head 5 by adhesion. That is, the seal part 9 can be fitted to the outer periphery part 5a from the outer side. The seal part 9 is integrally provided to the outer periphery part 5a of the valve head 5 by being mounted by inserting, adhesion or the like. The seal part 9 may be made of elastomer including various kinds of rubber. For example, the seal part 9 is made of silicone rubber which is a silicon base synthetic resins with the rubber property.

The seal part 9 may be prepared by resin integral molding relative to the valve head 5. Specifically, the seal part 9 may be integrally formed with the valve head 5 as one-piece component with resin material by integral molding. The seal part 9 and the valve head 5 may be integrally formed with insert-molding using metal and rubber or two color formation (double-molding) using rubber and plastic material.

A circular seal rubber 63 is fitted around the outer periphery of the intermediate part of the shaft part 6 to prevent invasion of particulates to the slide portion of the shaft part 6. A plate pressure 64 is installed above the seal rubber 63 as a stopper which regulates the maximum lift amount of the poppet valve 4.

ASV is equipped with the actuator which is a valve drive device driving the poppet valve 4 in the valve opening direction. The actuator has the cylindrical wall part 51 of the housing 2, an electromagnet with a coil 8 which generates magnetic force by being supplied with electricity, and a moving core 67 attracted by the electromagnet. The electromagnet has the coil 8, a stator core 65, and a yoke 66. The stator core 65 and the yoke 66 are magnetized to be an electromagnet by supplying electric power to the coil 8. The stator core 65 has an attraction part for attracting the moving core 67.

The moving core 67 is press-fitted around the outer periphery of small diameter part located above the shaft part 6. When electric power is supplied to the coil 8, the moving core 67 is magnetized and moved with the poppet valve 4 downward in the axial direction (that is a stroke direction). The stator core 65, the yoke 66, and the moving core 67 are provided as plural magnetic bodies which form a magnetic circuit with the coil 8. Alternatively, only the stator core 65 and the moving core 67 may be formed as the plural magnetic bodies which form a magnetic circuit with the coil 8 by eliminating the yoke 66. The stator core 65 may be split into multiple pieces.

The coil spring 7 is held between the plate pressure 64 and the moving core 67. The coil spring 7 generates a spring load which is a biasing force to return the moving core 67 to a default position. Moreover, relative to the poppet valve 4 and the moving core 67, the coil spring 7 may correspond to a load generator that generates a biasing force biasing the valve head 5 to separate from the seal part 9.

The coil 8 has a bobbin 69 made of resin and wiring with insulation film wound around the bobbin 69. The coil 8 is a magnetization coil which generates magnetic attracting force (magnetomotive force) when electric power is supplied to provide magnetic flux. Since the moving core 67, the stator core 65, and the yoke 66 are magnetized by the magnetic flux, the moving core 67 is attracted by the attraction part of the stator core 65, and moves downward in the stroke direction. The coil 8 is held in the cylindrical space (coil storage part) between the inner circumference of the cylindrical wall part 51 or the yoke 66, and the outer periphery of the cylindrical part of the stator core 65.

The coil 8 has a coil part between flange parts of the bobbin 69 and a pair of terminal leads taken out from the coil part. The periphery side of the coil part is covered and protected with a resin mold component corresponding to a resin case. The terminal lead of the coil 8 is electrically connected to a terminal 70 by welding or plastically deforming. A tip part of the terminal 70 is exposed in a male connector 72 of a connector housing 71 made of resin, and is inserted in a female connector of an external power supply or an electromagnetic valve drive circuit to make electric connection as a connector pin.

A foreign substance on the upper surface of the seal part 9 is made to drop as follows with reference to FIG. 3 and FIG. 4 when the valve is operated to open and close.

FIG. 3 illustrates a valve open state where the valve head 5 is distanced from the valve seat 3. In this state, the first projection part 31 and the second projection part 32, 33 are not in contact with the seal part 9. Therefore, the secondary air passage 35 and the communicate passage 56 communicate to each other. In this state, for example, in case where a foreign substance such as condensed moisture, water drop, or deposit contained in exhaust gas adheres to the upper surface of the seal part 9, the foreign substance stays on the upper surface of the seal part 9 that extends in the horizontal direction. If the foreign substance is fixed by being cooled with time elapse, the foreign substance may affect the operation of valve.

For example, if a check valve is opened by pulsation caused by the engine operation, a foreign substance such as fuel burning flows backwards, and the valve may be affected by the foreign substance adhering to the upper surface of the seal part 9. Moreover, the condensed water contained in exhaust gas may flow backwards, and may adhere to the upper surface of the seal part 9. If the adhering moisture is cooled, the moisture may freeze to be ice. These may happen when air supply by the electric air pump 14 is not performed. If the sealing by the valve is in imperfect state, exhaust gas leaks to the electric air pump 14, and there is a possibility of producing fault in the system.

When the valve closing operation advances from FIG. 3 to FIG. 4, the first projection part 31 and the second projection part 32, 33 come to contact the upper surface of the seal part 9. At this time, the second projection part 32, 33 collides with the seal part 9, and the foreign substance adhered to the surface of the seal part 9 can be broken. Furthermore, when the valve is lifted upward, the valve head 5 pushes the valve seat 3 upward, and the seal part 9 is elastically deformed, such that the valve is closed by the tight contact between the seal part 9 and the first projection part 31. In addition, at this time, the second projection part 32, 33 is also in the tight contact with the seal part 9.

When the valve opening operation advances from FIG. 4 to FIG. 3, the foreign substance that is made movable from the fixed state by the second projection part 32, 33 can be separate from the upper surface of the seal part 9, and is made to fall by the law of inertia, when the valve is moved downward. Also when the valve closing operation advances from FIG. 3 to FIG. 4, the foreign substance that is movable can be separate from the upper surface of the seal part and drop by the law of inertia, when the valve is moved upward. Thus, the foreign substance on the seal part 9 is broken and removed when the valve is opened and closed repeatedly. Accordingly, a foreign substance can be removed from the secondary air regulator valve 1.

According to the first embodiment, the seal part 9 is an elastically deformable portion prepared on the valve head 5. At the time of closing the valve, the valve seat 3 contacts the seal part 9, and fluid is restricted from flowing through the air passage 55. The valve seat 3 has the first projection part 31 that is projected annularly towards the upper surface of the seal part 9 from the lower surface 30 of the valve seat 3 opposing the seal part 9, and the second projection part 32, 33 that is projected towards the upper surface of the seal part 9 on the radially outer side of the first projection part 31. At the time of closing the valve, the first projection part 31 is in tight contact with the seal part 9, and the second projection part 32, 33 collides with the seal part 9.

Accordingly, when the valve head 5 is moved upward relative to the valve seat 3 to close the valve, the first projection part 31 contacts the seal part 9, and the seal part 9 is elastically deformed. Because the first projection part 31 is in the tight contact with the seal part 9, fluid is prevented from passing through the air passage 55. At the time of closing the valve, the second projection part 32, 33 collides with the seal part 9. By this collision, since the surface of the seal part 9 is struck, a foreign substance adhering to the seal part 9, such as deposit or ice, can be broken. The foreign substance broken or separated from the seal part 9 is not fixed to the seal part 9. Therefore, the foreign substance is removed from the upper surface of the seal part 9 by repetitive operation of opening and closing the valve. Thus, since a foreign substance is removed from the seal part 9, the sealing property between the first projection part 31 and the seal part 9 can be improved when the valve is closed.

The valve seat 3 has the second projection part 32, 33 corresponding to an edge part which changes the foreign substance from the fixed state to the movable state relative to the upper surface of the seal part 9. The first projection part 31 secures the sealing property with the seal part 9 after the foreign substance was removed. Therefore, a foreign substance can be removed from the valve part.

(Second Embodiment)

Figure 6:
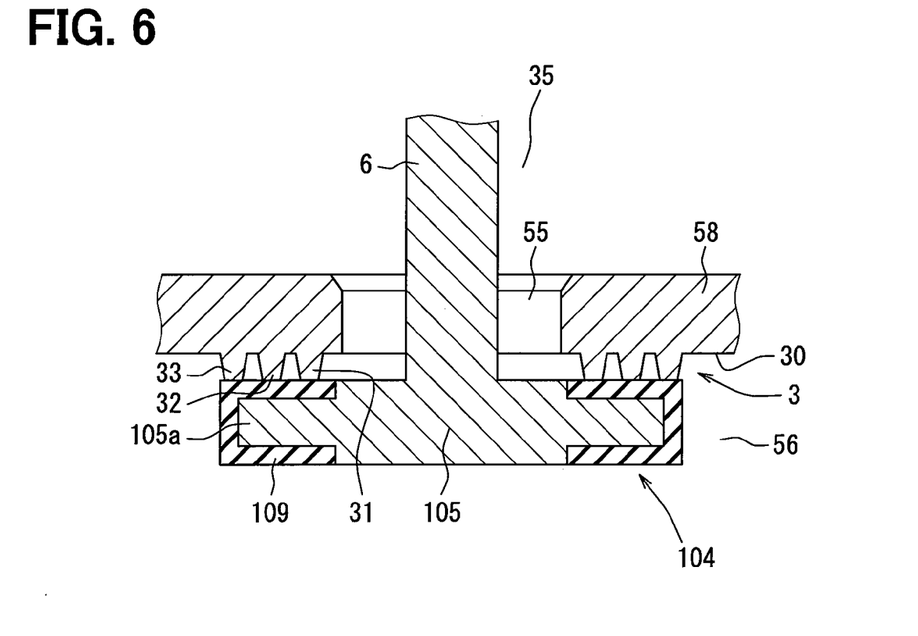
FIG. 6 is a partial view illustrating a closed state of a secondary air regulator valve according to a second embodiment.

In a second embodiment, the poppet valve 4 of the first embodiment is modified as a poppet valve 104 with reference to FIG. 6.

FIG. 6 shows a closed state of the poppet valve 104 of the secondary air regulator valve. The seal part 109 has the upper surface located to oppose the valve seat 3, and the upper surface of the seal part 109 is on the same plane as the surface of the valve head 105 without a level difference. The seal part 109 may be mounted to the outer periphery part 105a of the valve head 105 from the radially outer side. The seal part 109 is integrally fitted or bonded to the outer periphery part 105a. The seal part 109 can be formed by insert-molding to the outer periphery part 105a. That is, the seal part 109 and the valve head 5 may be integrally formed with insert-molding using metal and rubber or two color formation (double-molding) using rubber and plastic material.

According to the second embodiment, the surface of the seal part 109 is formed so that a level difference is not produced relative to the surface of the valve head 105. Since the surface of the seal part 109 and the surface of the valve head 105 are on the same plane, a foreign substance such as moisture cannot easily stagnate on the upper surface of the valve head 105. Therefore, moisture adhering to the valve head 105 can easily fall when the valve is operated to open and close. Thus, stay of moisture can be controlled, and the frozen moisture can be restricted from being generated.

(Third Embodiment)

A third embodiment is explained with reference to FIG. 7 in which the valve seat 3 of the first embodiment is modified to a valve seat 103.

Figure 7:
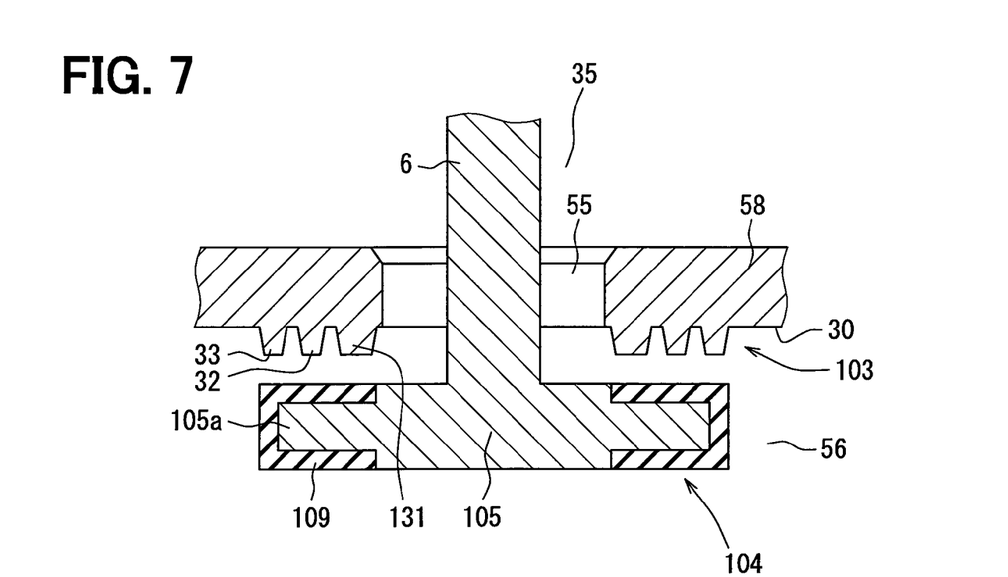
FIG. 7 is a partial view illustrating a secondary air regulator valve according to a third embodiment.

FIG. 7 shows an open state of the poppet valve 104 of the secondary air regulator valve. In the valve seat 103, the vertical section area of the first projection part 131 is larger than that of the second projection part 32, 33. In other words, the radial dimension of the first projection part 131 is larger than that of the second projection part 32, 33. Therefore, the contact surface area with the seal part 109 is larger in the first projection part 131 compared with the second projection part 32, 33, at the time of closing the valve. That is, compared with the second projection part 32, 33, the surface area of the first projection part 131 is larger at the tip end plane. Accordingly, the sealing property by the first projection part 131 can be improved.

(Fourth Embodiment)

A fourth embodiment is described with reference to FIG. 8 in which the valve seat 3 of the first embodiment is modified to a valve seat 203.

Figure 8:
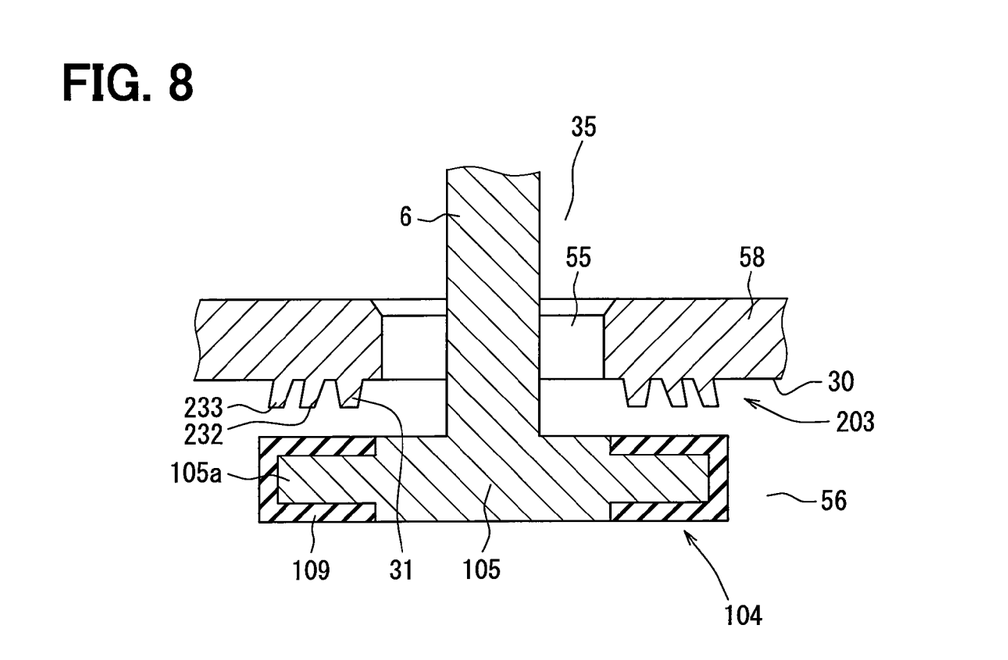
FIG. 8 is a partial view illustrating a secondary air regulator valve according to a fourth embodiment.

FIG. 8 shows an open state of the poppet valve 104 of the secondary air regulator valve. Each second projection part 232, 233 has the rectangle cross-sectional shape inclined to the radially outer side. Specifically, the root end adjacent to the surface 30 is located on the inner side of the distal end of the second projection part 232, 233 in the radial direction. The root end is adjacent to the air passage 55 than the distal end is. The second projection part 232, 233 is inclined radially outward as extending from the root end to the distal end. Moreover, compared with the first projection part 31, the surface area of the second projection part 232, 233 is smaller at the tip end plane. Therefore, the radial dimension of the second projection part 232, 233 is shorter than that of the first projection part 31 at the tip end in the vertical section.

According to the fourth embodiment, the second projection part 232 and the second projection part 233 have the cross-sectional form located outward in the radial direction as extending to the tip end from the root end. Accordingly, when the valve is repeatedly opened and closed, external force works on a foreign substance on the seal part 9 to remove the foreign substance outward in the radial direction.

(Fifth Embodiment)

A fifth embodiment is described with reference to FIG. 9 in which the valve seat 3 of the first embodiment is modified to a valve seat 303.

Figure 9:
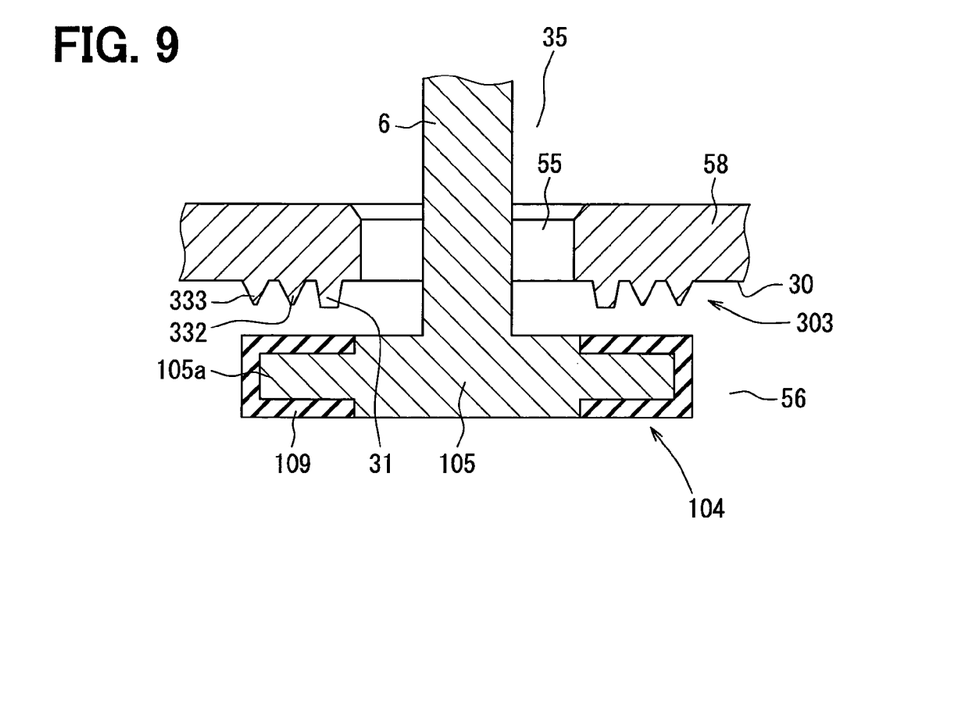
FIG. 9 is a partial view illustrating a secondary air regulator valve according to a fifth embodiment.

FIG. 9 shows an open state of the poppet valve 104 of the secondary air regulator valve. Each second projection part 332, 333 has a taper shape. Specifically, the radial dimension is smaller at the distal end of the second projection part 332, 333 than at the root end of the second projection part 332, 333. Furthermore, the tip end may be sharp in each second projection part 332, 333. For example, the second projection part 332 and the second projection part 333 are formed so that the tip end may be angled in the vertical section. Therefore, at the tip end, the radial dimension of the second projection part 332, 333 is smaller than that of the first projection part 31 in the vertical section.

According to the fifth embodiment, the second projection part 332 and the second projection part 333 are sharp at the tip end. Accordingly, the second projection part 332 and the second projection part 333 collide with the seal part 109 with very small contact surface at the time of closing the valve. For this reason, pressure given to the seal part 109 from the second projection part 332 and the second projection part 333 can be increased. Thus, the impulse force which breaks or removes a foreign substance can be further increased. Therefore, the second projection part 332 and the second projection part 333 can remove a foreign substance from the upper surface of the seal part 109 more reliably.

(Sixth Embodiment)

A sixth embodiment is described with reference to FIG. 10 in which the valve seat 3 of the first embodiment is modified to a valve seat 403.

Figure 10:
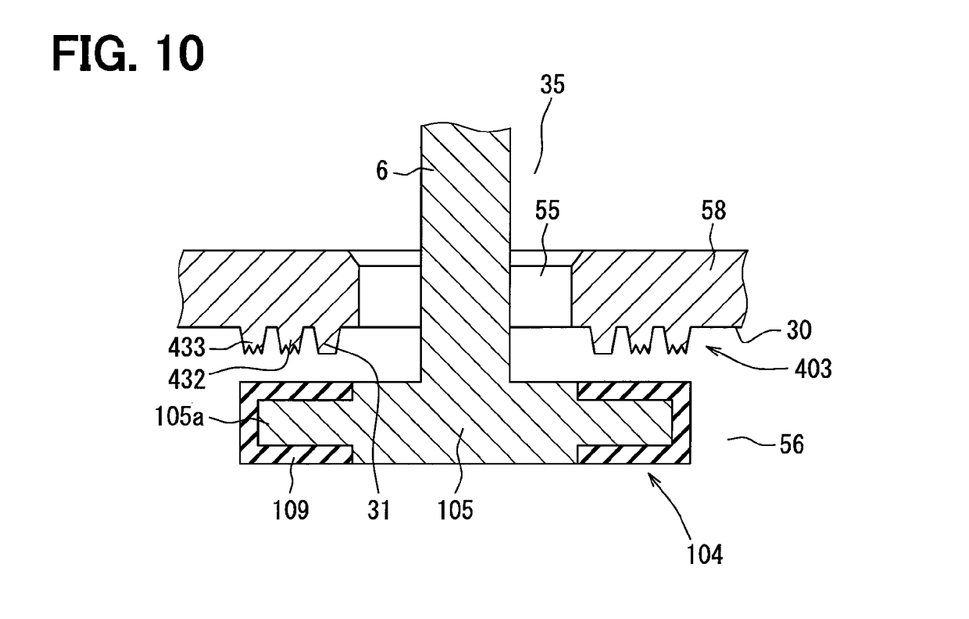
FIG. 10 is a partial view illustrating a secondary air regulator valve according to a sixth embodiment.

FIG. 10 shows an open state of the poppet valve 104 of the secondary air regulator valve. Each second projection part 432, 433 is sharp at the tip end. Specifically, each second projection part 432, 433 has plural edges at the tip end in the vertical section. For example, each second projection part 432, 433 is formed to have a comb-teeth shape at the tip end in the vertical section. Therefore, the radial dimension of the second projection part 432, 433 is smaller at the tip end in the vertical section than the first projection part 31.

According to the sixth embodiment, each second projection part 432, 433 has the comb-teeth shape at the tip end in the vertical section. Accordingly, at the time of closing the valve, the plural edges of the second projection part 432 or the second projection part 433 collide with the seal part 109 by very small contact surface relative to the seal part 109. For this reason, pressure given to the seal part 109 from the second projection part 332 and the second projection part 333 can be increased, and the impulse force can be given to the wide range at the plural points. Thus, since the impulse force can be pinpointly given in the concentrated state at the plural points adjacent to each other, it is possible to break a foreign substance finely, such that the performance of removing the foreign substance can be improved. Therefore, the second projection part 432 and the second projection part 433 can remove the foreign substance from the upper surface of the seal part 109 more reliably.

(Seventh Embodiment)

A seventh embodiment is described with reference to FIGS. 11-14 in which the seal part 9 of the first embodiment is modified to a seal part 209. FIGS. 11-14 illustrate only one side relative to the axis of the shaft part 6, and the other side is symmetrical to the one side.

Figure 11:
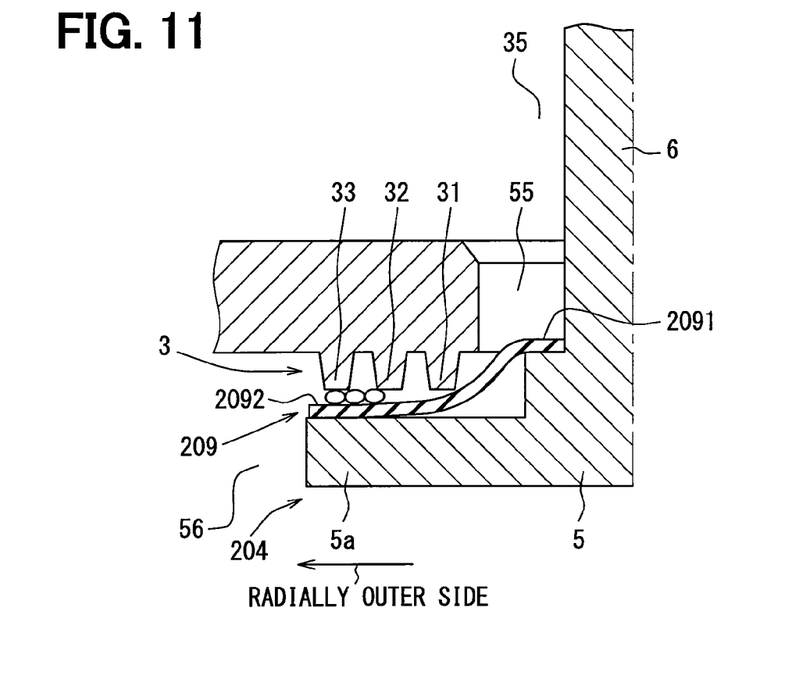
FIG. 11 is a partial view illustrating a first closed state of a secondary air regulator valve according to a seventh embodiment.

The seal part 209 is an annular component radially extending from the inner periphery 2091 to the outer periphery 2092, and is elastically deformable. The shaft part 6 is fitted into the inner periphery 2091. The seal part 209 is made of the same material as the seal part 9. The inner periphery 2091 is fixed to the valve, and the outer periphery 2092 is not fixed to the valve. The seal part 209 is a cantilever elastic component, in which the inner periphery 2091 equivalent to a radially inner end is fixed to the shaft part 6, and the outer periphery 2092 equivalent to a radially outer end is a free end.

The inner periphery 2091 is fixed to the shaft part 6 at the position higher than the upper surface of the valve head 5. As shown in FIG. 11, at the time of closing the valve, the seal part 209 is pressed by the valve seat 3, and the outer periphery 2092 is deformed to hang down at the position lower than the inner periphery 2091.

A foreign substance is removed from the upper surface of the seal part 209 as follows when the valve is operated to open and close with reference to FIGS. 11-14.

Figure 12:
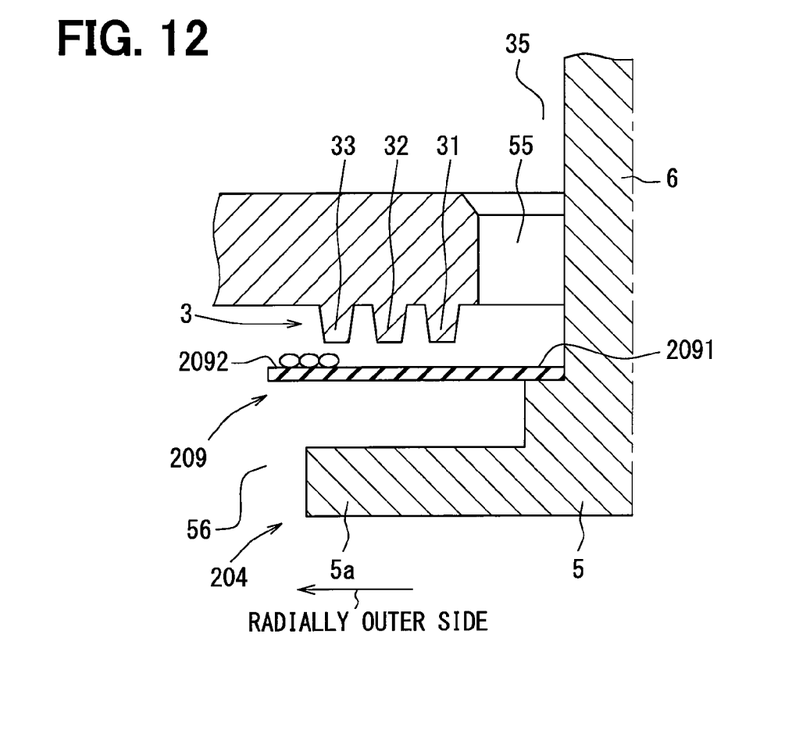
FIG. 12 is a partial view illustrating a first open state of the secondary air regulator valve of the seventh embodiment.
Figure 13:
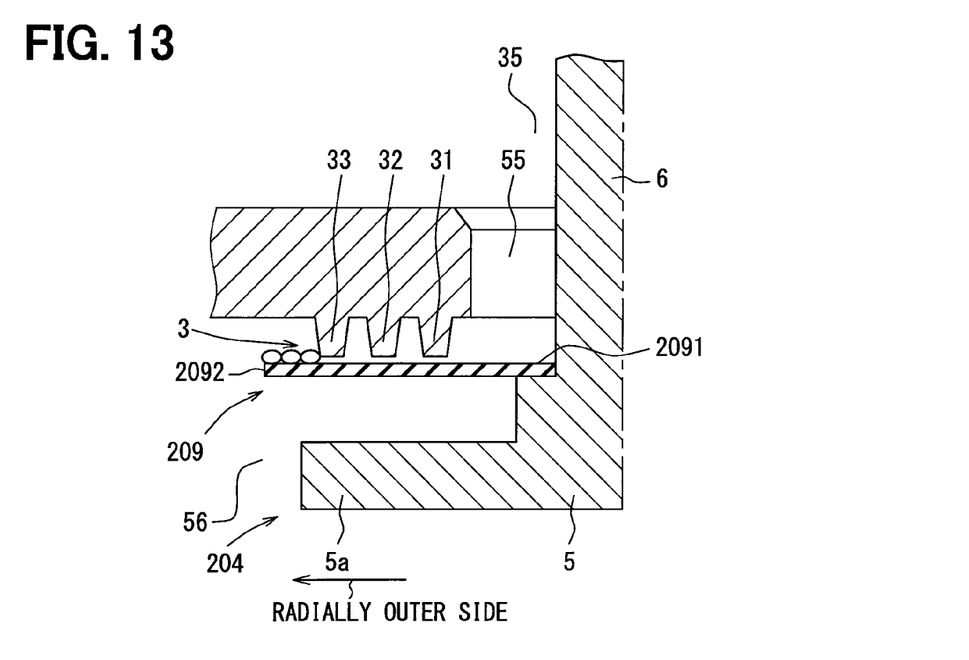
FIG. 13 is a partial view illustrating a second open state of the secondary air regulator valve of the seventh embodiment.
Figure 14:
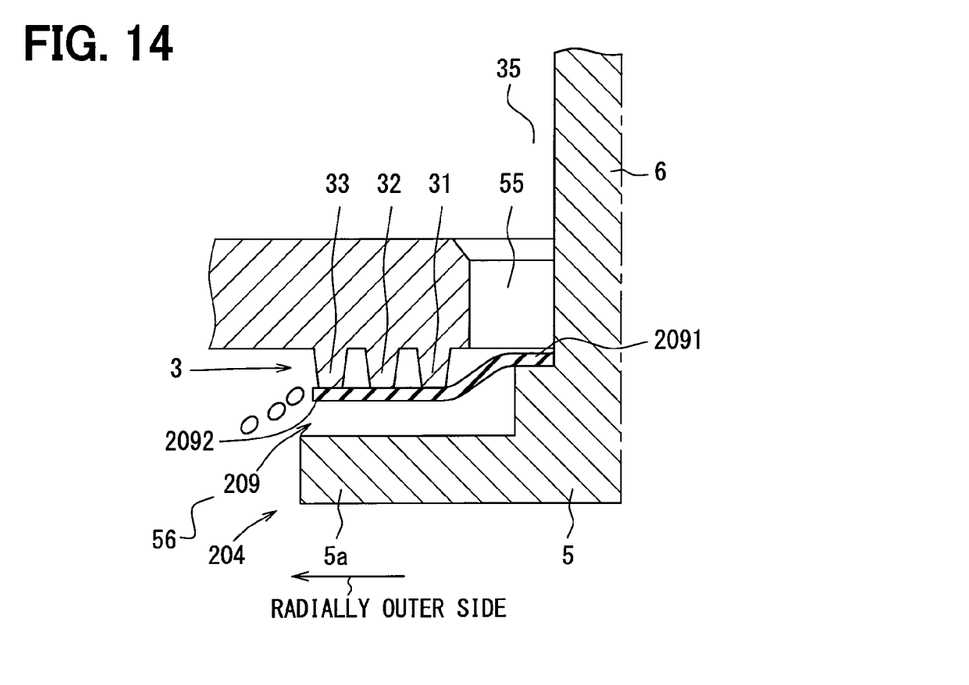
FIG. 14 is a partial view illustrating a second closed state of the secondary air regulator valve of the seventh embodiment.

FIG. 11 shows a valve closed state where the valve head 5 contacts to the valve seat 3. FIG. 12 shows a valve open state where the valve head 5 is separated from the valve seat 3. FIG. 13 shows a state where the valve head 5 approaches the valve seat 3 from the valve open state of FIG. 12. FIG. 14 shows a state where the valve head 5 further approaches the valve seat 3, and the outer periphery 2092 is pressed.

According to the valve closed state of FIG. 11, the seal part 209 is pressed downward by the first projection part 31, and the seal part 209 is elastically deformed so that the outer periphery 2092 hangs down with respect to the inner periphery 2091. At this time, the second projection part 32, 33 collides with the seal part 209, and the foreign substance on the seal part 209 is broken.

As shown in FIG. 12, when the valve is operated to open, since the seal part 209 restores to the original form, the foreign substance on the seal part 209 comes to be located on the radially outer side of the second projection part 32, 33. This is because the outer periphery 2092 which is a free end is moved outward in the radial direction. As shown in the shift from FIG. 11 to FIG. 12, the seal part 209 that was elastically deformed is changed to the form where the seal part 209 extends horizontally in parallel to the upper surface of the valve head 5.

Furthermore, in the shift from FIG. 12 to FIG. 13, the second projection part 32, 33 approaches the seal part 209, and the foreign substance (having ellipse shape in FIG. 13) on the seal part 209 is moved outward in the radial direction by the second projection part 32, 33. Therefore, the foreign substance on the seal part 209 is not crushed by the second projection part 32, 33.

Furthermore, in the shift from FIG. 13 to FIG. 14, the first projection part 31 and the second projection part 32, 33 press down the seal part 209 so that the seal part 209 is elastically deformed. At this time, the foreign substance is removed from the seal part 209 due to the elastic deformation of the seal part 209.

According to the seventh embodiment, the inner periphery 2091 which is an edge on the radially inner side is fixed to the shaft part 6, and the outer periphery 2092 which is an edge on the radially outer side corresponds to a free end. At the time of closing the valve, the radially outer end is elastically deformed by being pressed by the valve seat 3, and is located lower than the radially inner end.

Accordingly, the seal part 209 has large elastic deformation by opening-and-closing operation of the valve, and the free end of the seal part 209 can be displaced downward. At this time, the second projection part 32, 33 located adjacent to the free end slides on the seal part 209, and the foreign substance can be removed from the seal part 209 outward in the radial direction. Thus, the fluid control valve device can have the self-cleaning function.

(Eighth Embodiment)

An eighth embodiment is described with reference to FIG. 15 in which the seal part 209 of the seventh embodiment is modified to a seal part 309.

The seal part 309 is an annular component extending radially to the outer periphery 3092 from the inner periphery 3091 to which the shaft part 6 is fitted, and is elastically deformable. The seal part 309 is made of the same material of the seal part 209. The cross-section area of the inner periphery 3091 is larger than that of the outer periphery 3092 in the vertical section. The cross-section area of the seal part 309 is made gradually smaller in the vertical section as extending from the inner periphery 3091 to the outer periphery 3092.

The inner periphery 3091 is fixed to the valve, and the outer periphery 3092 is not fixed to the valve. The seal part 309 is a cantilever elastic component in which the inner periphery 3091 equivalent to a radially inner end is fixed to the shaft part 6, and the outer periphery 3092 equivalent to a radially outer end corresponds to a free end.

Figure 15:
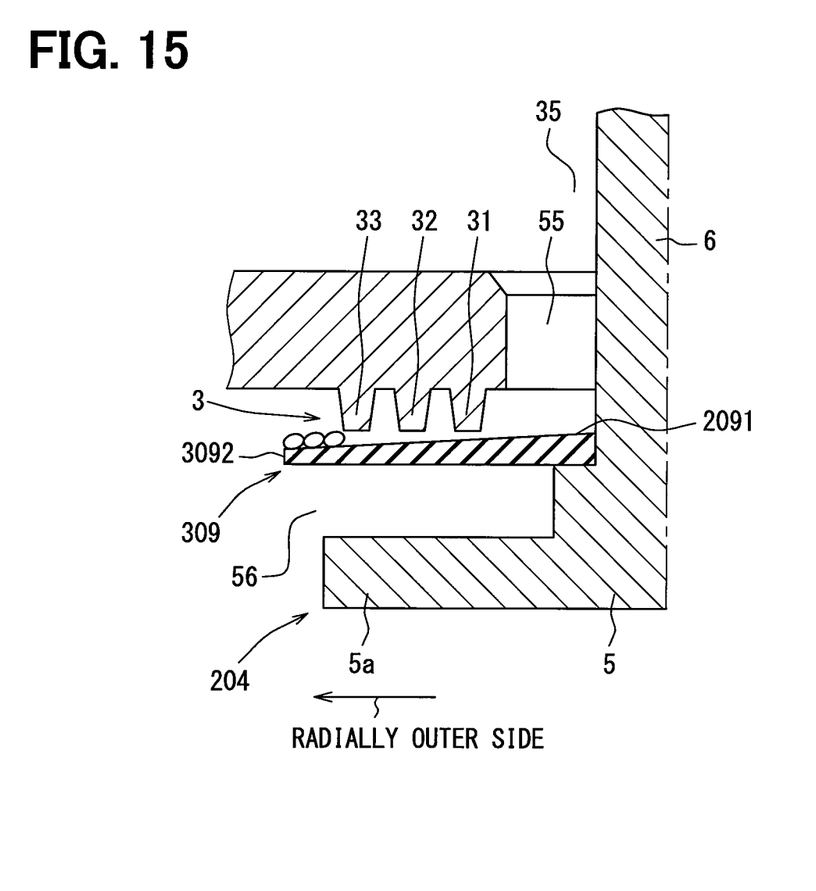
FIG. 15 is a partial view illustrating an open state of a secondary air regulator valve according to an eighth embodiment.

The inner periphery 3091 is fixed to the shaft part 6 at the position higher than the upper surface of the valve head 5, as shown in FIG. 15. At the time of closing the valve, the seal part 309 is pressed by the valve seat 3 and is deformed so that the outer periphery 3092 hangs down at the position lower than the inner periphery 3091.

The upper surface of the seal part 309 is gradually located lower as extending from the inner periphery 3091 to the outer periphery 3092. That is, the upper surface of the seal part 309 to which the second projection part 32, 33 collides has a slope shape descending toward the outer periphery 3092. Accordingly, the foreign substance broken by the second projection part 32, 33 easy slides down along the upper surface of the seal part 309. For this reason, it is easy to remove a foreign substance from the seal part 309.

(Other Embodiment)

While the desirable embodiment of the present disclosure is described, the present disclosure is not restricted to the embodiment mentioned, and can be implemented with various modification in the range not deviating from the scope of the present disclosure.

The scope of the present disclosure is not limited to the range exemplified with the structure of the embodiment. The range of the present disclosure is shown by the appended claims, and also includes all the changes in the equivalence.

The second projection part 32, 33 described in the first embodiment is not limited to position on the radially outer side of the first projection part 31. The second projection part 32, 33 may be a projection part annularly surrounding the circumference of the first projection part 31. Also in this case, the second projection part 32, 33 breaks the foreign substance adhering to the upper surface of the seal part 9 at the time of closing the valve.

The following effects are generated when the second projection part 32 and the second projection part 33 are made to project annularly to all the circumferences of the first projection part 31. The second projection part 32 and the second projection part 33 can break the foreign substance on the upper surface of the seal part 9 to be movable, and seal the clearance between the seal part 9 and the valve seat 3, at the time of closing the valve. The fluid control valve device can be offered in which the a foreign substance is removed and double sealing are achieved.

Such changes and modifications are to be understood as being within the scope of the present disclosure as defined by the appended claims.

What is claimed is:

1. A fluid control valve device comprising:
    a housing having a valve seat, in which a fluid passage is defined, to have an annular shape;
    a valve part that is able to open the fluid passage by moving away from the valve seat and to close the fluid passage by moving toward the valve seat; and
    a seal part disposed to the valve part, the seal part being elastically deformable and contacting the valve seat when the fluid passage is closed to intercept fluid from passing through the fluid passage, wherein
    the valve seat has
        a surface opposing the seal part,
        a first projection part projected from the surface toward an upper surface of the seal part and having an annular shape, and
        a second projection part projected from the surface toward the upper surface of the seal part on a radially outer side of the first projection part,
        a tip end of the second projection part has a radial dimension smaller than that of the first projection part, and
    when the fluid passage is closed by the valve part, the first projection part is in contact with the seal part, and the second projection part is configured to collide with the seal part.

2. The fluid control valve device according to claim 1, wherein
    the seal part has an outer surface that is flush with an outer surface of the valve part without a level difference.

3. The fluid control valve device according to claim 1, wherein
    the tip end of the second projection part has a sharp edge.

4. The fluid control valve device according to claim 1, wherein
    the tip end of the second projection part has a comb-teeth shape.

5. The fluid control valve device according to claim 1, wherein
    the seal part has
        a radially inner end fixed to the valve part, and
        a radially outer end corresponding to a free end, and
    the seal part is elastically deformed so that the radially outer end is located lower than the radially inner end by being pressed by the valve seat when the fluid passage is closed by the valve part.

6. The fluid control valve device according to claim 5, wherein
    the upper surface of the seal part to which the second projection part collides has a slope shape descending toward an outer periphery of the seal part.

7. A fluid control valve device comprising:
    a housing having a valve seat, in which a fluid passage is defined, to have an annular shape;
    a valve part that is able to open the fluid passage by moving away from the valve seat and to close the fluid passage by moving toward the valve seat; and
    a seal part disposed to the valve part, the seal part being elastically deformable and contacting the valve seat when the fluid passage is closed to intercept fluid from passing through the fluid passage, wherein
    the valve seat has
        a surface opposing the seal part,
        a first projection part projected from the surface toward an upper surface of the seal part and having an annular shape, and
        a second projection part projected from the surface toward the upper surface of the seal part on a radially outer side of the first projection part,
        the second projection part is separated into a plurality of units arranged in a circumferential direction with an interval around the first projection part, and
    when the fluid passage is closed by the valve part, the first projection part is in contact with the seal part, and the second projection part is configured to collide with the seal part.

8. A fluid control valve device comprising:
    a housing having a valve seat, in which a fluid passage is defined, to have an annular shape;
    a valve part that is able to open the fluid passage by moving away from the valve seat and to close the fluid passage by moving toward the valve seat; and
    a seal part disposed to the valve part, the seal part being elastically deformable and contacting the valve seat when the fluid passage is closed to intercept fluid from passing through the fluid passage, wherein
    the valve seat has
        a surface opposing the seal part,
        a first projection part projected from the surface toward an upper surface of the seal part and having an annular shape, and
        a second projection part projected from the surface toward the upper surface of the seal part on a radially outer side of thee first projection part,
        an outer surface of the seal part is flush with an outer surface of the valve part without a level difference at a position opposite the valve seat,
        a tip end of the second projection part has a radial dimension smaller than that of the first projection part, and
    when the fluid passage is closed by the valve part, the first projection part is in contact with the seal part, and the second projection part is configured to collide with the seal part.

9. The fluid control valve device according to claim 8, wherein
    the tip end of the second projection part has a sharp edge.

10. The fluid control valve device according to claim 8, wherein
    the tip end of the second projection part has a comb-teeth shape.

11. The fluid control valve device according to claim 8, wherein
    the seal part has
        a radially inner end fixed to the valve part, and
        a radially outer end corresponding to a free end, and
    the seal part is elastically deformed so that the radially outer end is located lower than the radially inner end by being pressed by the valve seat when the fluid passage is closed by the valve part.

12. The fluid control valve device according to claim 11, wherein
the upper surface of the seal part to which the second projection part collides has a slope shape descending toward an outer periphery of the seal part.

\* \* \* \* \*